Nov. 23, 1937.  F. L. MURPHY  2,099,702
AIR CONDITIONING SYSTEM FOR CARS
Filed Feb. 19, 1934  3 Sheets-Sheet 1
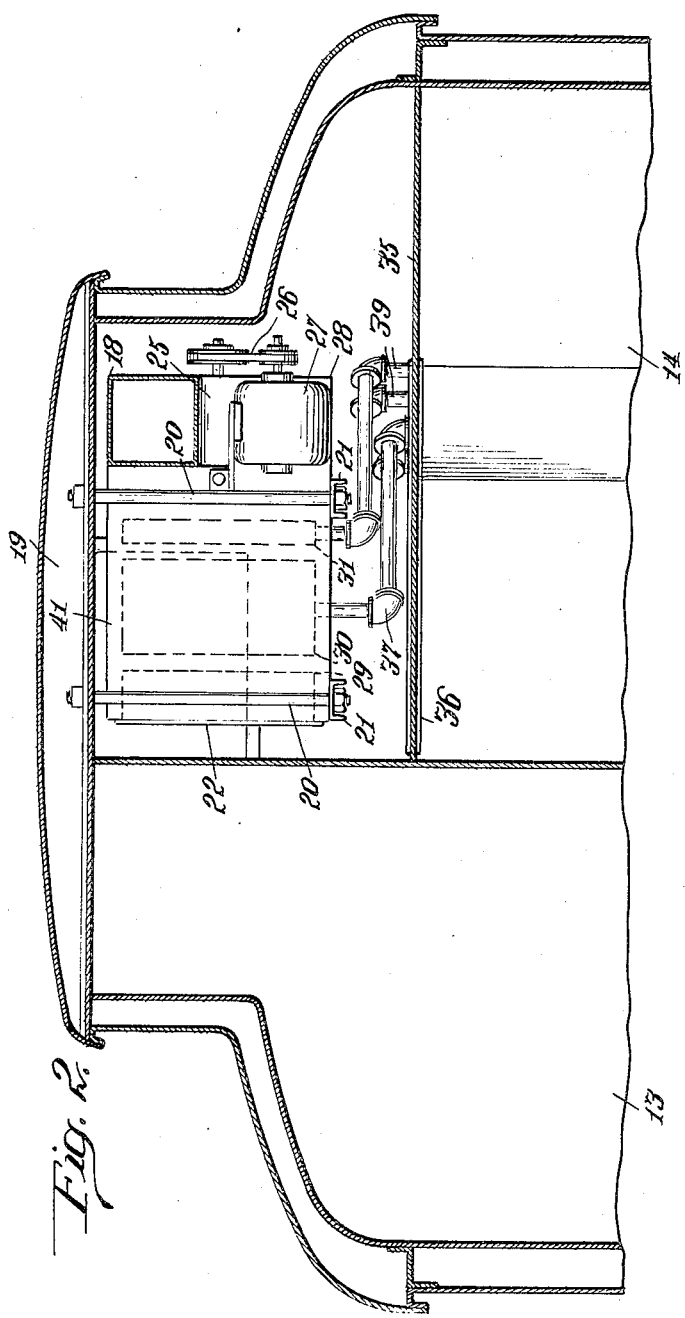
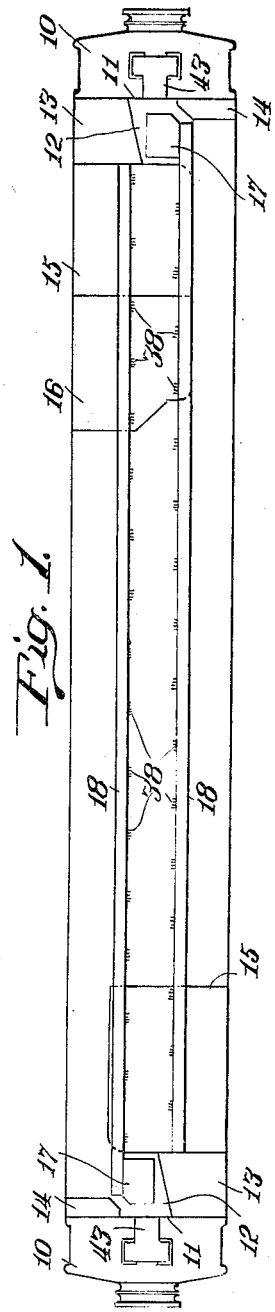
Inventor
Frank L. Murphy
Attorneys

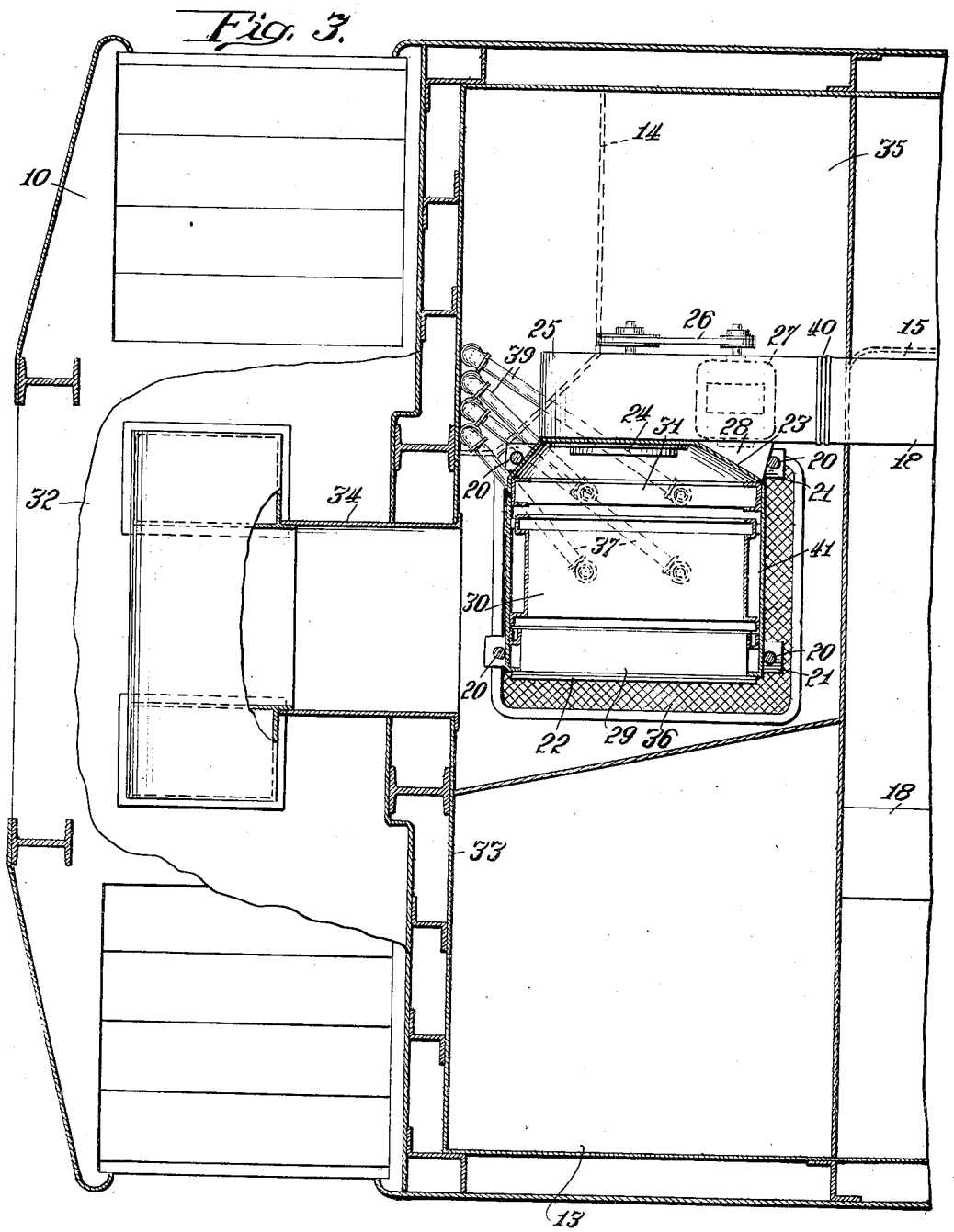

Nov. 23, 1937.  F. L. MURPHY  2,099,702
AIR CONDITIONING SYSTEM FOR CARS
Filed Feb. 19, 1934  3 Sheets-Sheet 3
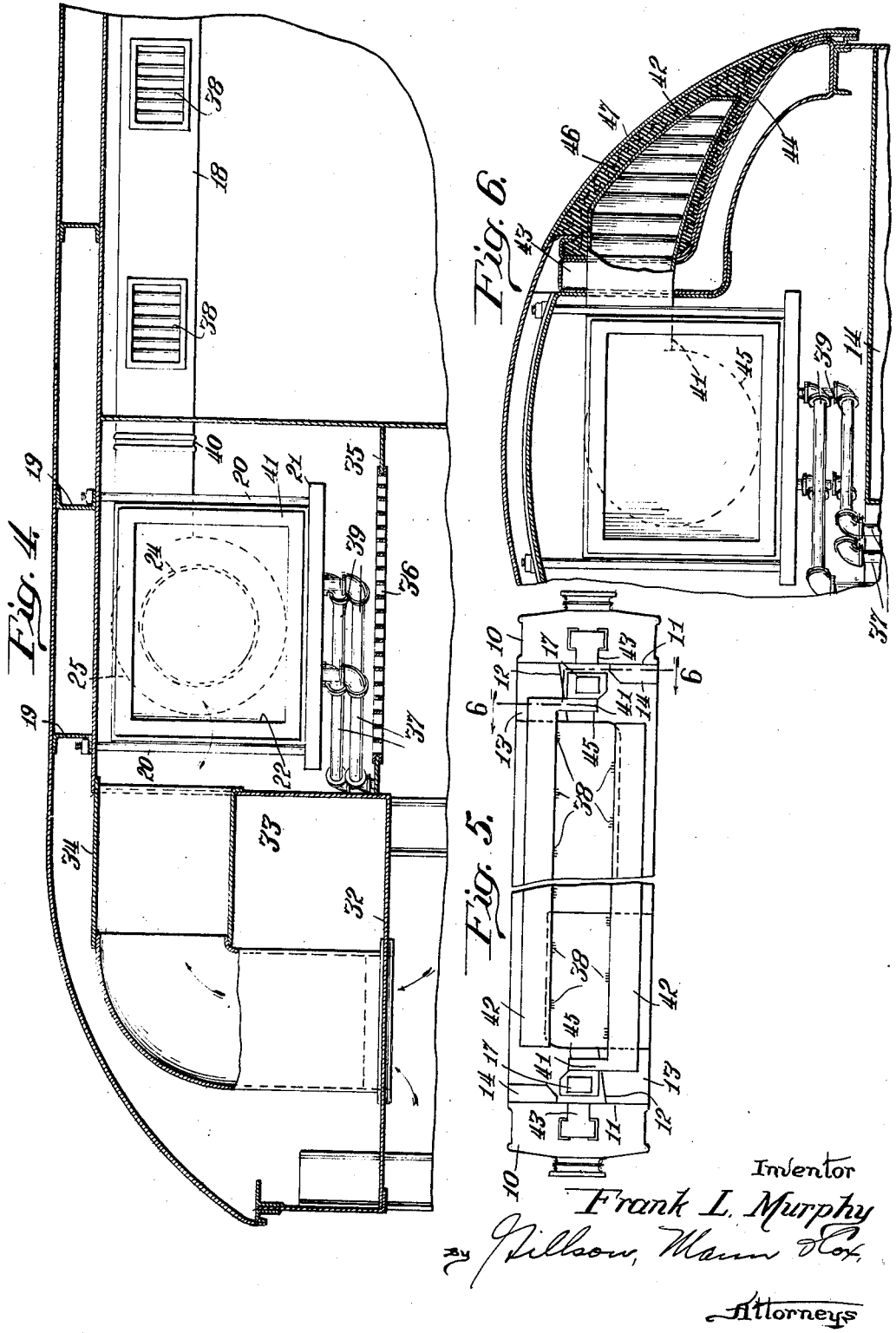

Patented Nov. 23, 1937

2,099,702

UNITED STATES PATENT OFFICE 2,099,702

AIR CONDITIONING SYSTEM FOR CARS

Frank L. Murphy, Chicago, Ill., assignor to Pullman-Standard Car Manufacturing Company, Chicago, Ill., a corporation of Delaware Application February 19, 1934, Serial No. 711,858

1 Claim. (Cl. 98—4)

The principal object of this invention is to fit air conditioning apparatus to available space in passenger cars and provide more uniform conditions in the passenger space than has heretofore been obtained.

Generally speaking, this is accomplished by making two conditioning devices, or units, of about half the capacity required, and mounting one overhead in each passageway adjacent to the end of the car and having it deliver through a duct running substantially throughout the length of the passenger space and overlapping the duct of the other unit.

Smaller blowers, coolers, casings, etc., can be used in each unit or group, and thus be more easily accommodated overhead and in space not required for other purposes. And, by delivering the air from each end throughout the length of the passenger space, the decline in efficiency in each apparatus as the distance to the point of delivery increases, is offset by the more favorable conditions in the opposed apparatus. If there is a drop in temperature, or pressure, towards the remote end of one delivery duct the deficiency is made up by the better temperature and pressure obtaining in the other duct in that area.

Only half the returned air being taken from each passageway there is no appreciable draft and the noise is reduced to a negligible quantity.

When the load is light, one unit alone is sufficient to carry it.

Other objects and advantages of the invention will appear as the disclosure proceeds and the description is read in connection with the accompanying drawings, in which Fig. 1 is a diagrammatic plan view of a sleeping car equipped according to this invention;

Fig. 2 is a transverse section adjacent to one end of the car showing the apparatus located overhead in the passageway and masked by a false ceiling;

Fig. 3 is a plan section looking downward on the apparatus at one end of the car with the roof removed;

Fig. 4 is a longitudinal section through the roof portion at one end of the car showing the location of the apparatus;

Fig. 5 is a diagrammatic plan view similar to Fig. 1, illustrating an alternative arrangement for use when the delivery ducts are on the outside on the lower deck of the monitor roof;

Fig. 6 is a transverse section through a car so equipped, the left side and the lower portion being broken away.

In the plan view of Fig. 1, the vestibule platforms 10 are separated by doors 11 from passageways 12 between the water closets 13 and the adjacent lockers 14 and extending alongside the lavatories 15. Next to the lavatory at the right end a drawing-room 16 is also indicated. This comes as near a conventional sleeping car plan as can be found.

Each unit or group in the separate air conditioning apparatus located in the passageway 12 is indicated at 17, connected with a duct 18 running along inside the clearstory, or side deck of the roof, to the wall of the water closet at the opposite end of the car.

In Figs. 2, 3 and 4, the apparatus is shown more in detail where it will be seen that there is a casing 41 generally rectangular in form, suspended from two carlines 19 by bolts 20 and inverted channels 21.

One end 22 of the casing is open to admit the air to be conditioned and the other end is drawn down at 23 to connect with the inlet 24 of a centrifugal blower 25, driven by a belt 26 from an electric motor 27 carried by a bracket 28 fixed to the casing.

The casing is fitted with a filter 29, a cooler 30 and a heater 31 of suitable form and kind, depending on the conditions. As a rule a filter space 20" x 4" x 24" will be sufficient, a heater space 17½" x 2" x 15" will be sufficient and a cooler space 17½" x 9" x 24" will be sufficient.

An inlet for fresh air is made by cutting openings through the vestibule ceiling 32 and the end wall sheathing 33. The vestibule chamber will then become a settling space to remove a large portion of entrained solids and thereby relieve the filter.

The space above the vestibule ceiling can also be used for settling, or duct tubing 34 may be fitted in to connect the opening through the vestibule ceiling to the opening through the end wall sheathing 33 and thereby deliver the fresh air into the upper part of the passageway.

The apparatus in the passageway is masked by inserting a false ceiling 35 above the door and secured to the walls surrounding the passageway. An inlet for returned air from the passenger space is provided by an opening 36 in the false ceiling and a part of this opening may also be used to reach the filter for cleaning and replacing.

A liquid refrigerant may be supplied to the cooler through pipes 37 brought up through the locker 14 from beneath the car where mechanical refrigeration or ice bunkers are located. The coolers at each end may be supplied from the same or separate refrigerating apparatus. Vapor or steam may be supplied to the heater through pipes 39, coming up through the locker from the train pipe below.

Each blower 25 is flexibly connected at 40 with a delivery duct 18 extendng through all partition walls to the closet wall at the opposite end of the car, and provided with slots or louvres 38 suitably spaced throughout its length, to promote mixing and prevent back pressure.

The proportions of outside and returned air may be varied and regulated by providing adjustable shutters, or valves, at the inlets to be controlled manually, or automatically, as desired.

In Fig. 5 the casings 41 are turned through 90° to make the blower 25 deliver crosswise to the car towards the outside ducts 42, which as indicated in Fig. 6, are built against the deck sides 43 and supported on the lower decks 44. Where the outlet of the blower joins the ducts 42, directing fans 45 are inserted to assist in turning the current of air from crosswise to lengthwise of the car. Being outside it is necessary to provide the ducts with generous insulation 46, covered with suitable weather proofing 47.

I claim as my invention:—

In a passenger car having an interior passenger space and a roof therefor, a false ceiling for the upper part of said space at each end portion of the car forming a pair of chambers, an air conditioning device in each of said chambers, both devices being capable of continuous, simultaneous operation, each device comprising a cooler and blower removably supported as a unit from the roof by securing means accessible from below the unit and each unit being of relatively small size, having a capacity less than the normal requirements of the car, the capacity of both units taken together being sufficient for said normal requirements, each false ceiling being apertured for admitting to the adjacent chamber air from the passenger space and being removable to permit insertion and removal of the unit in said chamber by manipulation of said securing means, a duct extending from each device toward the other having openings for discharging conditioned air into the passenger space, and ducts communicating with the chambers and with the exterior of the passenger space for supplying fresh air to said chambers.

FRANK L. MURPHY.